(12) United States Patent
Tiuri

(10) Patent No.: US 6,829,230 B1
(45) Date of Patent: Dec. 7, 2004

(54) ROUTING IN A PACKET SWITCHED NETWORK

(75) Inventor: Markku Tiuri, Espoo (FI)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 860 days.

(21) Appl. No.: 09/663,232

(22) Filed: Sep. 15, 2000

(30) Foreign Application Priority Data

Sep. 17, 1999 (GB) ............................................. 9921868

(51) Int. Cl.[7] ............................................. H04L 12/28
(52) U.S. Cl. ..................................... 370/351; 370/400
(58) Field of Search .............................. 370/351, 389, 370/392, 395.1, 396, 400, 401, 395.3, 395.31, 395.5, 395.52, 395.54; 342/357.06, 357.07, 357.08, 357.09, 357.1, 357.11, 357.12; 701/213, 215

(56) References Cited

U.S. PATENT DOCUMENTS

| | | | |
|---|---|---|---|
| 4,939,726 A | | 7/1990 | Flammer et al. |
| 5,727,057 A | * | 3/1998 | Emery et al. .......... 379/201.07 |
| 6,236,652 B1 | * | 5/2001 | Preston et al. .............. 370/349 |

FOREIGN PATENT DOCUMENTS

| | | |
|---|---|---|
| WO | 97/05725 A1 | 2/1997 |
| WO | 99/46899 | 9/1999 |
| WO | 00/27091 A1 | 5/2000 |

OTHER PUBLICATIONS

Farrell et al, DNS Encoding of Geographical Location, RFC 1712, pp. 1–7, Nov. 1994.*
Imielinski et al, GPS–Based Addressing and Routing, RFC 2009, pp. 1–27, Nov. 1996.*
Tomasz Imielinski, et al., "GPS–Based Addressing and Routing", Technical Report, Rutgers University, Online!, Mar. 7, 1996, XP002167189, pp. 1–35, Computer Science Department, Rutgers, The State University, Piscataway, NJ 08855.
Peter Teoh, Re: "GPS Info in IP Addresses", IETF Archives, Online!, Information Technology Institute, Singapore; Aug. 16, 1996, XP002167190, pp. 1–2, CCNY, Inc. unix.internet.security; www.netsys.com/ietf/1996/3000.
W. Dobosiewicz, et al., "A bounded–hop–count deflection scheme for Manhattan–street Networks", Proceedings of Infocom, U.S. Los Alamitos, IEEE Computer Soc Press, vol. Conf. 156, Mar. 24, 1996, pp. 172–179, XP 000622308, Publication Date Mar. 24, 1996.

* cited by examiner

Primary Examiner—Frank Duong

(57) ABSTRACT

In a packet switched network, an address is allocated to a user of the packet switched network. The address includes information identifying the geographical location of the user, such as longitude, lattitude, and altitude. The address is used to route data packets over the network from a remote location to the user, taking into account the geographic location of each router in relation to the location of the user. A method of allocating the address to the user includes determining the geographical location of the user using a Global Positioning System receiver and generating an address based on the determined geographical location.

10 Claims, 3 Drawing Sheets

ROUTING IN A PACKET SWITCHED NETWORK

BACKGROUND

The present invention relates to routing in a packet switched network and more particularly to the generation and allocation of addresses for routing data in a packet switched network. The invention is applicable in particular, though not necessarily, to the generation and allocation of addresses in the Internet.

The Internet comprises a web of routers interconnected by transmission links (typically copper cables or optical fibres). Internet users typically connect their personal computers to the Internet via an access network such as a PSTN telephone network using a dial-up modem. The access network is in turn connected to the Internet via a Network Access Server (such as an Internet Service Provider). Other users may be connected to a Local Area Network (LAN) which is in turn connected directly to an Internet router.

The Internet is a packet switched network in which data to be transmitted is bundled into packets known as "datagrams". A datagram can carry a payload of variable length with the length being indicated in the datagram header. Each user is allocated a unique IP address comprising a prefix portion (i.e. MSBs) which identifies the network to which the user is connected and a suffix portion (i.e. LSBs) which identifies the user to that network. Each datagram is accompanied by the IP address of the destination user (as well as the IP address of the originating user), and the datagram is routed to the destination user by intervening routers in accordance with that IP address.

The current IPv4 standard defines IP addresses which are 4 octets (32 bits) long. Address ranges are allocated to networks by the US authority INTERNIC, with networks typically allocating individual IP addresses to users dynamically, as and when users request an Internet connection. The growth in the availability and use of the Internet in the last few years has been enormous and there are proposals to introduce an IPv6 standard defining 16 octet long EP addresses. It is hoped that this will prove sufficient to cope with future growth in the Internet.

SUMMARY

A number of problems are inherent in the current Internet address generation and allocation process and which are unlikely to be overcome by the introduction of IPv6.

A first problem is that the allocation of addresses at the top level is made by a single authority (INTERNIC). This may lead to inequities and certainly causes delays and increased administrative responsibilities when introducing a new network. A related problem arises because addresses are allocated dynamically to users by a network, adding a time delay to a user's internet connection time. Moreover, it can be difficult for a user to identify the IP address allocated to some other user with whom that first user wishes to communicate because of this dynamic allocation of IP addresses.

There is often a need to enter IP addresses manually into users' computers, servers, routers, etc. There is an obvious possibility for errors in such manual data entry operations.

It will be appreciated that these problems are not only limited to the Internet but also arise in other heavily used packet switched networks including Wide Area Networks (WANs) and mobile telecommunications networks.

It is an object of the present invention to overcome or at least mitigate the disadvantages noted in the preceding paragraphs. This and other objects are achieved by generating addresses for packet switched network users on the basis of the geographical location of the users.

According to a first aspect of the present invention there is provided a method of allocating an address to a user of a packet switched network, where the address is used to route data packets over the network from a remote location to the user, the method comprising determining the geographical location of the user and generating an address on the basis of the determined geographical location.

It will be appreciated that, subject to the resolution with which a user's location is determined, each user or set of users may be allocated a unique address within the data network. Address allocation is no longer the responsibility of a single authority but rather becomes an inherent property of a user's location. The generated address corresponds to or is mathematically derivable from the determining geographical location.

The present invention facilitates the sending of location specific data packets. That is to say that providing the (approximate) location of a user is known it is possible to communicate with that user.

Preferably, the packet switched network is an EP network comprising a plurality of routers which route data packets in accordance with destination IP addresses which accompany the datagrams (or other data derived from the destination IP addresses). More preferably, the data network is the Internet.

Preferably, said step of determining the geographical location of the user comprises using a Global Positioning System (GPS) receiver to determine the longitude and latitude (and optionally the altitude) of the user. Alternatively, the location of the user may be determined using two or more fixed terrestrial stations. For example, a user's location may be determined using measurements made by a mobile telephone device and a mobile telecommunications network.

According to a second aspect of the present invention there is provided apparatus for use in allocating an address to a user of a packet switched network, the apparatus comprising input means for receiving the geographical location of the user and processing means for generating an address on the basis of the received geographical location.

Preferably, said processing means is arranged to generate a packet header containing said geographical location. In use, the packet header also contains the geographical location of the destination for a packet.

According to a third aspect of the present invention there is provided a device for accessing a packet switched data network, the device comprising:

position determining means for determining the geographical location of the device; and apparatus comprising input means for receiving the geographical location of the device and processing means for generating an address on the basis of the received geographical location.

Whilst the present invention may be employed with existing packet switched network architectures, it makes possible the introduction of an entirely new architecture which offers significant advantages.

According to a fourth aspect of the present invention there is provided a packet switched data network comprising a multiplicity of interconnected routers each of which has a knowledge of its own geographical location as well as the geographical locations of its neighbouring routers, and each of the routers being arranged in use to route a received data packet to a neighbouring router on the basis of its own location, the locations of the neighbouring routers, and geographical destination/routing information contained in the data packet.

Embodiments of the above fourth aspect of the invention give rise to a number of significant advantages over existing packet switched networks. These include avoiding the need to continuously update routing tables of the routers (reducing network traffic), accelerating the routing process as the need to examine lengthy routing tables is avoided, and a reduction in the complexity of routers.

Preferably, said multiplicity of routers comprises a first set of north/south sub-routers and a second set of east/west sub-routers, at least some of the routers of both sets being interconnected to allow the direction of a data packet to be switched from north/south to east/west and vice versa.

Preferably, each router is arranged to examine a Current Direction Indicator contained in a received data packet to determine the current transmission direction of the packet. Each router also examines a distance counter contained in a received data packet, and which indicates the distance which the packet has travelled in the indicated direction or the remaining transmission distance in that direction. In the event that a distance counter indicates that the receiving router is the destination router (e.g. is the router which serves the destination user) in the indicated direction, the router either causes the direction to be switched, from north/south to east/west and vice versa, or causes the packet to be sent to a user connected to the router.

According to a fifth aspect of the present invention there is provided a method of routing a data packet in a packet switched network, the method comprising the steps of:

a) generating a data packet header containing at least the longitudes and latitudes of the source and destination of the data packet, the header also containing a direction indicator indicating the direction of transmission of the packet and a distance counter indicating the distance travelled by the packet in the indicated direction or the remaining distance in that direction;

b) sending the data packet in the indicated direction to a neighbouring router and updating the distance counter;

c) examining the data packet header at the receiving router to determine whether or not the receiving router represents the destination router in the indicated direction;

d) if not, then sending the data packet in the indicated direction to a neighbouring router and updating the distance counter; and e) if yes, then updating the direction indicator with an indicator orthogonal to the original indicator and calculating a new distance counter indicating the distance travelled by the packet in the new indicated direction or the remaining distance in that direction, and repeating steps b) to d) until the receiving router represents the destination router in the indicated direction.

According to a sixth aspect of the present invention there is provided a method of allocating an address to a mobile station of a cellular telecommunications network, where the address is used to route data packets over the network from a remote location to the mobile station, the method comprising generating an address on the basis of the geographical location of a node of the network to which the mobile station is connected.

In a GSM network, the node may be a base station or a base station controller or an MSC. In a UMTS network, the node may be a base station, RNC, MSC, SGSN, etc.

DETAILED DESCRIPTION

Figure 1:
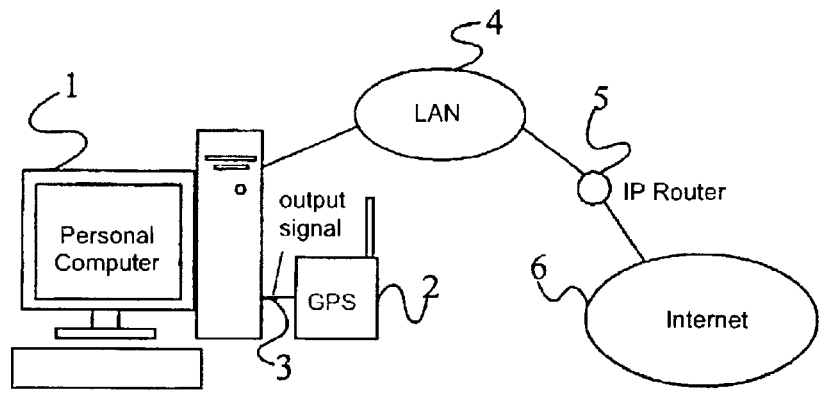
FIG. 1 illustrates schematically an Internet user terminal incorporating a GPS receiver.

There is illustrated in FIG. 1 a personal computer (PC) 1 which may be a conventional PC comprising a Pentium™ microprocessor or the like. The PC 1 is coupled to a Global Positioning System (GPS) receiver 2 which is also of known type and which relies upon the monitoring of radio frequency signals transmitted from orbiting satellites to determine its own position in terms of latitude, longitude, and altitude. Currently, GPS receivers are able to fix a position to an accuracy of 20 meters but this accuracy is likely to improve in the future. The GPS receiver 2 generates an electrical output signal 3 which contains latitude and longitude readings in terms of degrees, minutes, and seconds, and an altitude reading in terms of meters. This signal 3 is passed to an input port of the PC 1.

The PC 1 is arranged to run an IP address generation program either during installation, on request, or more likely each time a user initiates an Internet access. This program uses as the basis for the UP address the most recent reading received from the GPS receiver 2. Longitude measurements are represented as a 20 bit binary number (180×3600) with an additional bit indicating either a westerly or easterly direction from the selected origin, whilst latitude measurements are represented by a 19 bit binary number (90×3600) with an additional bit indicating either a northerly or southerly direction from the equator. Altitude (from 4 km below sea level to 12 km above) is represented by a 12 bit binary number with an additional bit indicating the direction from sea level). Thus, the position of the PC 1 can be defined by a 54 bit binary number. Assuming that IP addresses are 64 bits in length, this leaves 10 bits (or 1023 device addresses) available to the PC 1. In the present example, the PC 1 selects one of these available addresses for its own use. However, it will be appreciated that a group of closely located Internet terminals may share the available set of addresses in a manner which avoids an address conflict.

As illustrated in FIG. 1, the PC 1 is connected to a Local Area Network (LAN) 4, which is in turn connected to an IP router 5. The IP router 5 is the entry point to the Internet 6 for the LAN 4. In a conventional Internet access system, it would be the responsibility of some Internet server (connected to the LAN 4) to allocate an IP address to the PC 1. However, as already discussed, in the present example the EP address is self-generated by the PC 1.

Figure 2:
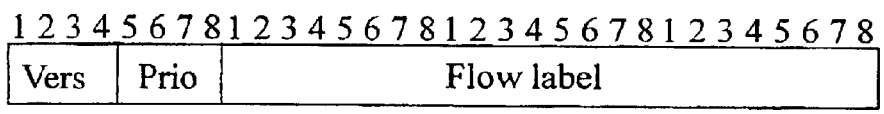
FIG. 2 illustrates the structure of an IP datagram header.
Figure 2:
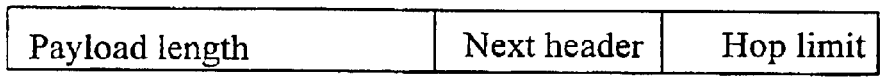
Figure 2:
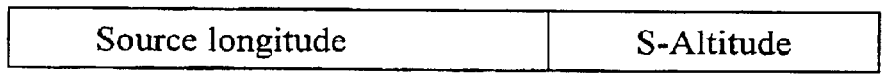
Figure 2:
Figure 2:
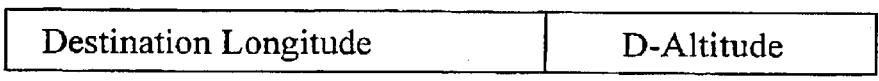
Figure 2:
Figure 2:

During an Internet session, datagrams sent from the PC 1 over the Internet 6 comprise a header portion having the structure illustrated in FIG. 2. The fields of the header relevant to the routing of datagrams are:

the source (i.e. PC 1) longitude, latitude, and altitude;

the destination (i.e. the destination node for the datagram) longitude, latitude, and altitude;

the direction indicators w, n, and u which when set to 1 indicate a western, northern, and upwards location respectively and which when set to 0 indicate the reverse locations (relative to some fixed origin);

the distance counter which maintains the remaining distance to the destination in the current direction of travel (E/W, N/S, or U/D);

the current transfer direction indicator (Dir) which indicates the current direction of transmission of the datagram (E/W or N/S); and the delivery direction complete indicator (Sto) which indicates which, if any, delivery direction (E/W or N/S) has been completed to the end.

Figure 3:
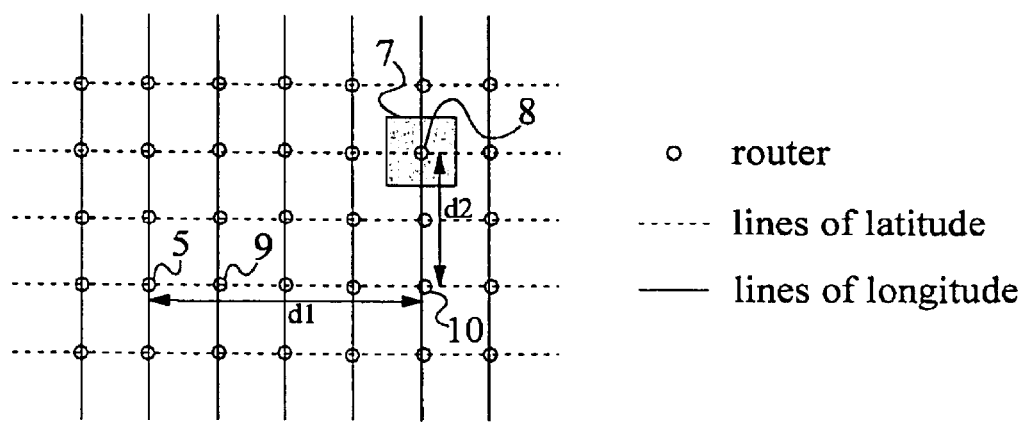
FIG. 3 illustrates schematically a modified router structure of the Internet.

FIG. 3 illustrates an Internet router structure which represents a modification to the existing structure. Each router may be thought of as a pair of co-located sub-routers: namely an east/west sub-router and a north/south sub-router. The east/west sub-routers route datagrams along lines of latitude whilst the north/south sub-routers route datagrams along lines of longitude.

Consider now a datagram generated by the user of the PC 1 which is connected to the router 5 as illustrated in FIG. 3. Assume that the destination for the datagram is a server which is located within a region 7 and which is connected to a LAN which is in turn connected to a router 8. The PC 1 will know its own location and the location of the destination server. The PC 1 first determines the most direct longitudinal direction to the destination server (east) and then determines the longitudinal distance (d1) to the server. The former is entered into the Dir field with the latter being entered into the Distance counter field. The datagram is passed from the PC 1 to the router 5 (via the LAN 4) where it is determined that the datagram must be sent to the next router 9 in an easterly direction. Based upon its knowledge of its own position, and that of the router 9, the router 5 is able to determine the distance to the router 9. Prior to sending the datagram, the Distance counter is updated by subtracting that determined distance from the value currently held by the Distance counter (d1).

Upon receipt of the datagram by the router 9, the header part of the datagram is checked to see if the Direction counter has a value which exceeds more than 50% of the distance to the next router in an easterly direction. As this is the case in the present example, the router 9 will immediately forward the datagram to the next router in an easterly direction. This process continues until the datagram reaches the router 10. At this router 10, it is identified that the value in the Direction counter is less than 50% of the distance to the next router in an easterly direction. The router 9 then analyses the Sto field of the header and identifies that no direction delivery has previously been completed, i.e. the easterly delivery is the first to be completed. The router 10 therefore computes the latitudinal distance d2 to the destination server and updates the Distance counter with this value. The Dir field is also updated to indicate a northerly transmission direction and the Sto filed is updated to indicate that an easterly transmission direction has been completed. The datagram is then sent from router to router until it reaches the router 8 where the Distance counter is again identified as being less than 50% of the distance to the next router in a northerly direction. The destination router 8 is able to determine that it is the destination router either from the destination location contained in the header or by analysing the Sto field.

The final delivery to the destination server from the router 7 is achieved via the local area network to which the destination server is connected.

Figure 4:
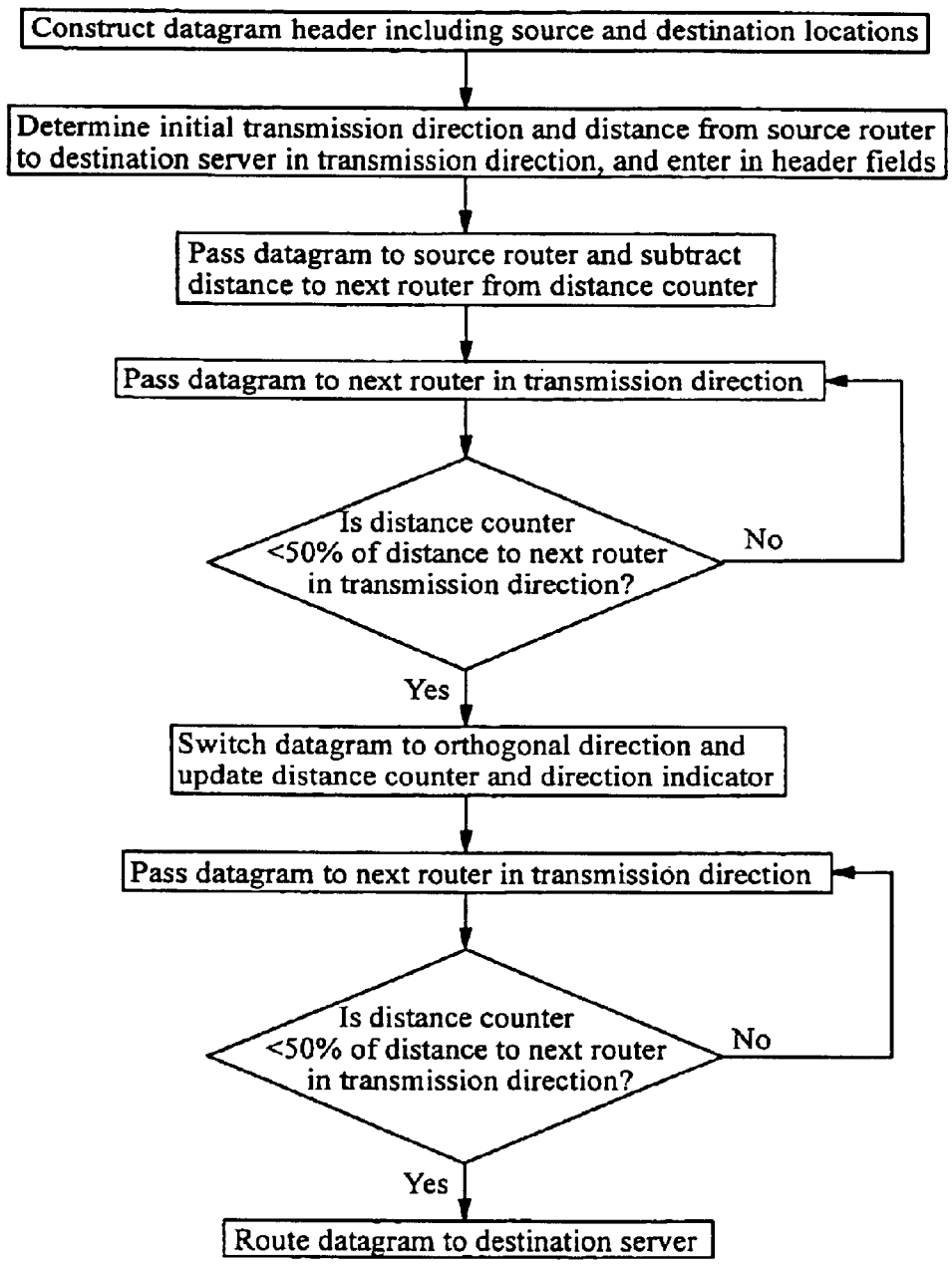
FIG. 4 is a flow diagram illustrating a method of routing datagrams in the network of FIG. 3.

The method described above is further illustrated in the flow diagram of FIG. 4.

It will be appreciated by the person of skill in the art that various modifications may be made to the above described embodiment without departing from the scope of the present invention. For example, whilst the use of the Distance counter and the Dir field offer a particularly fast mechanism for routing data packets, routing may be carried out purely on the basis of the destination location, i.e. latitude, longitude and altitude. It will also be appreciated that the term "user" is not restricted to a PC as described above. For example, the "user" may be a server or a router, or even a mobile terminal.

In the case of a mobile terminal registered with a cellular telecommunications network, the IP address allocated to the terminal may be derived in part from the geographical location of the node via which the terminal connects to the network. For example, the IP address may comprise a prefix corresponding to the location of the connection node and a suffix part corresponding to the terminal identity. In a GSM network, the connection node may be a base station. Once a packet has been routed to the connection node, mobile IP may be used to route the packet to the destination terminal.

What is claimed is:

1. A method of routing a data packet in a packet switched network, the method comprising the steps of
    a) generating a data packet header containing at least the longitudes and latitudes of the source and destination routers of the data packet, the header also containing a direction indicator indicating the direction of transmission of the packet and a distance counter indicating one of the distance travelled by the packet in the indicated direction and the remaining distance in that direction;
    b) sending the data packet in the indicated direction to a neighboring router and updating the distance counter,
    c) examining the data packet header at the receiving router to determine whether the receiving router represents the destination router in the indicated direction;
    d) sending the data packet in the indicated direction to a neighboring router and updating the distance counter if the router does not represent the destination router;
    e) updating the direction indicator with an indicator orthogonal to the original indicator and calculating a new distance counter indicating one of the distance travelled by the packet in the new indicated direction and the remaining distance in that direction if the router represents the destination router, and
    f) repeating steps b) through d) until the receiving router represents the destination router in the indicated direction.

2. A method according to claim 1, wherein the packet switched network is an IP network comprising a plurality of routers for routing data packets, wherein a portion of each data packet comprises a destination IP address and each data packet is routed in accordance with its destination IP address.

3. A method according to claim 2, wherein the IP network is the Internet.

4. A method according to claim 1, further comprising determining a geographical location of the user comprises using a Global Positioning System receiver to determine the longitude and latitude (and optionally the altitude) of the user.

5. A method according to claim 1, further comprising determining a geographical location of the user comprises using a Global Positioning System receiver to determine the longitude, latitude, and altitude of the user.

6. Apparatus for use in allocating an address to a user of a packet switched network, the apparatus comprising:
    input means for receiving a geographical location of the user; and processing means for generating an address based on the received geographical location, wherein the processing means is arranged to generate a data packet header containing at least the longitudes and latitudes of the source and destination routers of the data packet, the header also containing a direction indicator indicating the direction of transmission of the packet and a distance counter indicating one of the distance travelled by the packet in the indicated direction and the remaining distance in that direction.

7. A device for accessing a packet switched data network, the device comprising:

position determining means for determining a geographical location of the device;

input means for receiving the geographical location of the device; and processing means for generating an address based on the received geographical location, wherein the processing means is arranged to generate a data packet header containing at least the longitudes and latitudes of the source and destination routers of the data packet, the header also containing a direction indicator indicating the direction of transmission of the packet and a distance counter indicating one of the distance travelled by the packet in the indicated direction and the remaining distance in that direction.

8. A packet switched data network comprising a plurality of interconnected routers, wherein each router has a knowledge of its own geographical location and the geographical location of each of its neighboring routers, each of the routers being arranged to route a received data packet to a neighboring router on the basis of its own location, the location of each of the neighboring routers, and the geographical destination and routing information contained in the data packet, wherein each router is arranged to examine a direction indicator contained in a received data packet to determine the current transmission direction of the received data packet, and each router examines a distance counter contained in the received data packet, the distance counter indicating one of a distance which the received data packet has travelled in an indicated direction and a distance which remains for the received data packet to travel in an indicated direction.

9. A network according to claim 8, wherein each router comprises:

a first set of north/south sub-routers; and a second set of east/west sub-routers, wherein at least some of the routers of the first set and some of the routers of the second set are interconnected, thereby allowing a direction of a data packet to be switched from north/south to east/west and vice versa.

10. A network according to claim 1, wherein:

each router acts to change the indicated direction of the received data packet in the event that the distance counter indicates that the router is the destination router in the indicated direction, wherein the change in the indicated direction is one of switching from north/south to east/west, switching from east/west to north/south, and causing the received data packet to be sent to a user connected to the router.

* * * * *